United States Patent
Sims et al.

(10) Patent No.: US 12,306,803 B1
(45) Date of Patent: May 20, 2025

(54) FILE SYSTEM PROTOCOL ROUTING PLATFORM HAVING A LOCAL REFLECTED COPY OF A REMOTE FILE SYSTEM STRUCTURE

(71) Applicant: Alchemi Data Management, Inc., Friday Harbor, WA (US)

(72) Inventors: Robert Charles Sims, Round Rock, TX (US); Michael Randolph Jones, Friday Harbor, WA (US)

(73) Assignee: Alchemi Data Management, Inc., Friday Harbor, WA (US)

( * ) Notice: Subject to any disclaimer, the term of this patent is extended or adjusted under 35 U.S.C. 154(b) by 0 days.

(21) Appl. No.: 18/502,590

(22) Filed: Nov. 6, 2023

(51) Int. Cl.
*G06F 16/00* (2019.01)
*G06F 16/14* (2019.01)
*G06F 16/182* (2019.01)

(52) U.S. Cl.
CPC ........ *G06F 16/1844* (2019.01); *G06F 16/148* (2019.01)

(58) Field of Classification Search
CPC .......................... G06F 16/1844; G06F 16/148
See application file for complete search history.

(56) References Cited

U.S. PATENT DOCUMENTS

| | | | |
|---|---|---|---|
| 5,873,085 A * | 2/1999 | Enoki | G06F 16/10 |
| 6,374,248 B1 * | 4/2002 | Nazari | H04L 67/63 |
| 2003/0217030 A1 * | 11/2003 | Byrne | G06F 11/2038 |
| 2005/0234961 A1 * | 10/2005 | Edvalson | H04L 67/1097 |
| | | | 707/999.102 |
| 2011/0083098 A1 * | 4/2011 | Cisler | G06F 9/451 |
| | | | 715/781 |
| 2021/0132852 A1 * | 5/2021 | Liu | G06F 3/0604 |
| 2023/0068262 A1 * | 3/2023 | Bafna | G06F 9/45558 |

* cited by examiner

*Primary Examiner* — Syed H Hasan
(74) *Attorney, Agent, or Firm* — Brian F. Russell

(57) ABSTRACT

A routing platform coupled to a data network maintains, on local storage of the routing platform, a reflected file system structure corresponding to that of a file system on a network file share. The file system includes a file system object including file system object data, and the reflected file system structure includes a copy of the file system object lacking the file system object data. The routing platform presents, as a proxy, the network file share to a client node communicatively coupled to the routing platform via the data network. The routing platform routes file system protocol traffic between the client node and the network file share, and, if needed, does so by reference to the reflected file system structure.

27 Claims, 10 Drawing Sheets

| Administration and reporting 450 | | | | | |
|---|---|---|---|---|---|
| Search 440 | Menu ext. 442 | Notification engine 444 | | Limit templates 446 | Job engine 448 |
| Index- ing 420 | Tagg -ing 422 | Ver. 424 | Multi copy 426 | File reco- very 430 | Cap. mngmt 432 | Migration 434 | Single- instancing 436 |
| Browser ext. 414 | | Data synchronization 416 | | | |
| Business logic 412 | | | | | |
| Reflector File System (RFS) 410 | | | | | |
| Detection 404 | | Isolation 406 | | Remediation 408 | |
| File system protocol routing 402 | | | | | |

FILE SYSTEM PROTOCOL ROUTING PLATFORM HAVING A LOCAL REFLECTED COPY OF A REMOTE FILE SYSTEM STRUCTURE

BACKGROUND OF THE INVENTION

The present application relates generally to data storage and, in particular, to network-accessible data storage. Still more particularly, the present application relates to a file system protocol routing platform that serves as a proxy for network-accessible storage and provides extensions to file system functionality for the network-accessible storage.

In the era of so-called "big data" in which enterprises can have many terabytes or petabytes of data to be stored, processed, and/or communicated, an enterprise-class data storage solution generally cannot rely solely on the local data storage devices of the individual computing platforms within the enterprise to satisfy data storage and data sharing requirements. Instead, enterprise-class data storage solutions generally augment the capacities and capabilities of the local data storage devices of the enterprise computing platforms with a combination of on-premises, off-premises, and/or "cloud" data storage. Herein, data storage that is not local to an individual computing platform and is instead communicatively coupled to the computing platform via one or more communication networks is referred to generally as "network-accessible storage." To avoid confusion in terminology, it should be appreciated that such network-accessible storage can include, but is not limited to, NAS (network-attached storage) drives.

While adoption of network-accessible storage allows enterprises to improve data sharing and to easily scale data storage capacity on-demand with little, if any, additional storage management overhead, adoption of network-accessible storage also generally leads to greater access latencies because the data is accessed by enterprise computing platforms over possibly multiple data networks. As a result, file system commands (e.g., open, read, write, move, delete, etc.) are slowed by physical network latencies and the latency attributable to the processing of file system commands through the network protocol stack.

Another issue with current implementations of network-accessible storage is that some storage solutions are accessible only via a software interface (e.g., a web browser) that is separate from and different than the native file system browser utilized to access the local data storage devices of a computing platform. Because local file system objects and file system objects residing on network-accessible storage are accessed utilizing separate and different interfaces, a user is undesirably forced to utilize different processes to access and manage file system objects depending on their storage location. Further, different functionality may apply to different file system objects depending on where the file system objects are physically stored.

BRIEF SUMMARY

In view of the foregoing, the present application appreciates that it would be useful and desirable to provide improved data storage solutions. The present application additionally appreciates that is would be useful and desirable to provide improved routing for file system protocol network traffic and to leverage the routing to extend the functionality and capabilities provided by the underlying file system.

In various embodiments, a file system protocol routing platform extends the functionality of an underlying file system by routing file system protocol network traffic utilizing a reflected file system structure that provides, in local storage of the file system protocol routing platform, a local skeleton copy of a remote file system structure residing on the network-accessible storage. Aspects of the disclosed inventions can be implemented as methods, systems, and program products.

In at least one embodiment, a file system protocol routing platform coupled to a data network maintains, on local storage of the file system protocol routing platform, a reflected file system structure corresponding to that of a file system on a network file share. The file system includes a file system object including file system object data and metadata about the file system object, and the reflected file system structure includes a copy of the file system object that includes the metadata but lacks the file system object data. The routing platform serves as a proxy presenting the network file share to a client node communicatively coupled to the routing platform via the data network. The routing platform routes file system protocol traffic between the client node and the network file share, and, if needed, does so by reference to the reflected file system structure.

In at least some embodiments, the file system protocol routing platform, based on receiving notification of an access failure to a file system object, automatically reissues a file system access command to access an alternative copy of the file system object.

In at least some embodiments, the file system protocol routing platform obtains an access path for a file system object to which access is requested by a client node from extended attributes associated with the copy of the file system object in the reflected file system structure.

In at least some embodiments, the file system protocol routing platform, based on a first configuration command, automatically creates a copy of the file share on another network file share by issuing, on the data network, a plurality of file system commands by reference to the reflected file system structure.

In at least some embodiments, the file system protocol routing platform, based on a configuration command, demotes a first network file share from being a primary network share and promotes a second network file share that is a duplicate of the first network file share to become the primary network file share.

In at least some embodiments, the file system protocol routing platform implements single-instancing of file system objects on the network file share. Implementing single-instancing includes deleting a duplicate copy of the file system object from the network file share and updating extended attributes associated with the duplicate copy of the file system object in the reflected file system structure to specify an access path to the file system object on the network file share.

In at least some embodiments, the file system protocol routing platform, based on selection of a control of a file system browser at a client node, determines a subset of responsive file system objects by reference to the reflected file system structure and provides to the client node a listing of the subset of responsive file system objects.

In at least some embodiments, the control of the file system browser is one of the following set: a control for a textual search of contents of file system objects, a control for visual presentation of tags applied to file system objects, and a control for searching versions of file system objects.

BRIEF DESCRIPTION OF THE SEVERAL VIEWS OF THE DRAWINGS

FIG. 4 is a layer diagram illustrating an exemplary software stack that can be implemented on a file system protocol routing platform in accordance with one embodiment;

DETAILED DESCRIPTION

Figure 1:
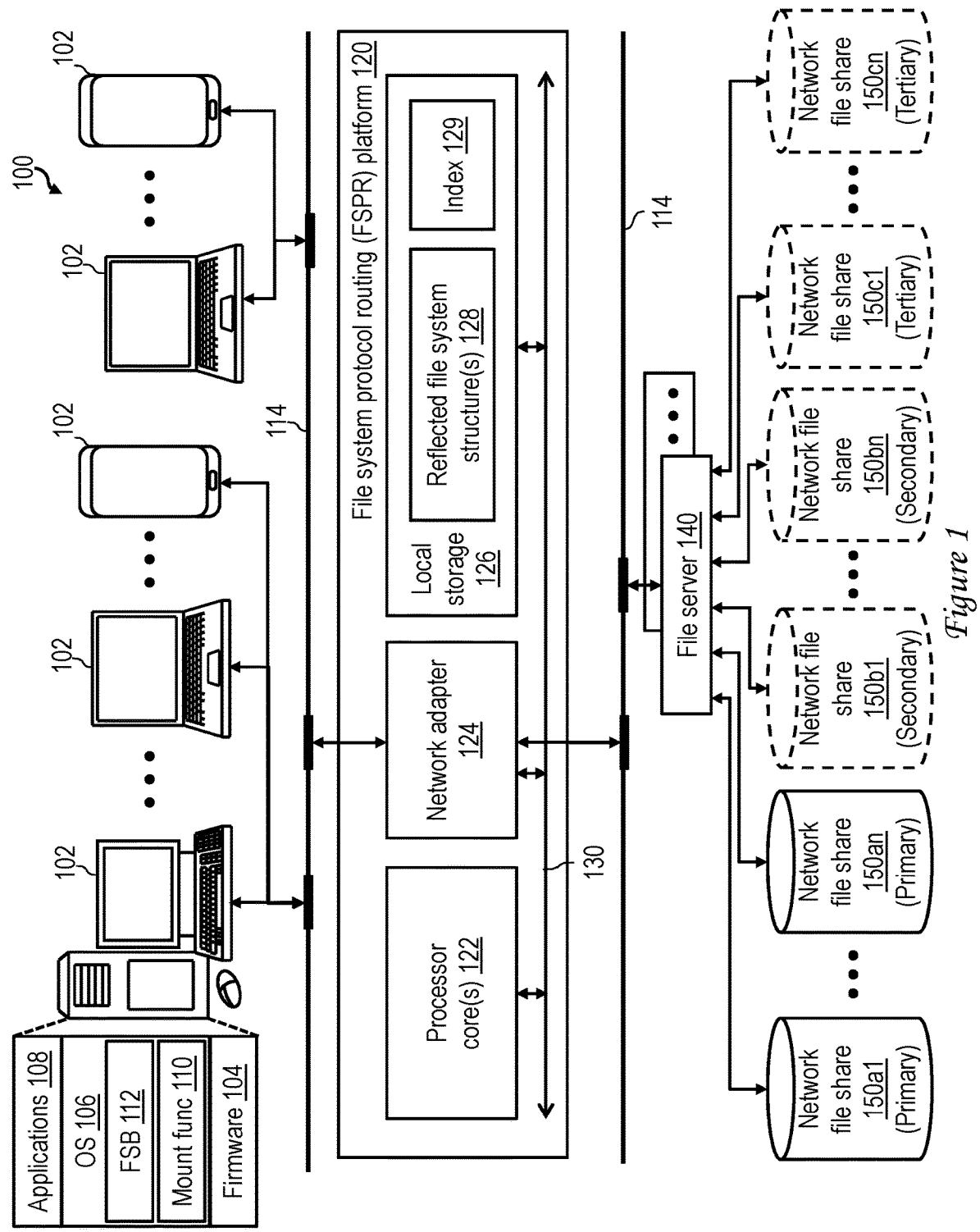
FIG. 1 is a high-level block diagram of an exemplary data processing environment in accordance with one embodiment.

With reference now to the figures, in which like reference numerals refer to like and corresponding parts throughout, and in particular with reference to FIG. 1, there is illustrated an exemplary data processing environment 100 in accordance with one or more embodiments. As shown, data processing environment 100 includes one or more client nodes 102 (illustrated generally as various computing devices, such as server computers, desktop computers, laptop computers, tablet computers, mobile phones, embedded computers, automotive computers, etc.). Each client node 102 generally includes at least a processor core (or cores) for processing software and data, local data storage, and a network interface, as is known in the art. In some cases, a given client node 102 may be associated with a particular user; in other cases, a client node 102 may be utilized by multiple users. In some implementations, client nodes 102 may all belong to a common enterprise; in other implementations, at least some of client nodes 102 belong to different users or enterprises.

Each client node 102 generally executes on its processor core(s) a software stack including platform firmware 104, an operating system (OS) 106 (e.g., Linux, iOS, macOS, Windows, Android, etc.), and applications 108. In the illustrated example, OS 106 includes, among other components, a file system browser (FSB) 112 configured to enable the associated client node 102 to browse and access file systems and file system objects and a mount function 110 that enables OS 106 to mount network file shares presented by a file server 140. In some alternative embodiments, FSB 112 can be implemented as one of applications 108 running on OS 106 rather than as a component of OS 106.

Data processing environment 100 additionally includes network-accessible storage that can be accessed by client nodes 102 to, among other things, store and retrieve data. In the depicted example, the network-accessible storage can comprise, for example, cloud storage (e.g., a local cloud, remote cloud, or hybrid cloud), network attached storage (NAS) drives, and/or a storage area network (SAN). In the depicted example, the network-accessible storage is accessed via at least one file server 140 that presents the underlying physical data storage drive(s) (not explicitly illustrated in FIG. 1) as at least one or more primary network file shares 150*a*1-150*an*. As is known in the art, each network file share 150 can be assigned a name or other logical identifier. In a typical implementation, file server 140, which is accessed via a unique network (e.g., IP) address, is responsible for implementing access rights, permissions, and security for the network-accessible storage and for implementing a selected file system on the network-accessible storage (e.g., Network File System (NFS), ZFS, SSH File System (SSHFS), Server Message Block (SMB) file system, etc.). The selected file system determines how data on a physical data storage drive is formatted, organized, and accessed. In general, file systems logically represent data on a drive in a file system structure (e.g., tree, web, graph, etc.) that specifies the types, relationships, and organization of various file system objects (FSOs), such as files, folders, and/or directories.

Client nodes 102 communicate with file server 140 via one or more data network(s) 114, which can include, for example, local area network(s) and/or wide area networks, including the Internet. The communication of file system protocol traffic on data network(s) 114, which is initiated and/or terminated by client nodes 102 and file server 140, can employ conventional network protocols, as described in greater detail below with reference to FIGS. 2-3.

In accordance with one or more embodiments, data processing environment 100 further includes at least one file system protocol routing (FSPR) platform 120 coupled to data network(s) 114. In at least one preferred embodiment, FSPR platform 120 can be realized as an in-network stand-alone special-purpose data processing system (also referred to as a "hardware appliance") communicatively interposed between client nodes 102 and file server 140. FSPR platform 120 presents primary network file shares 150*a*1-150*an* to client nodes 102, thus serving as a proxy for file server 140. In addition, FSPR platform 120 routes Layer 3 network packets including file system protocol traffic between client nodes 102 and file server 140, as described further herein. In some implementations, FSPR platform 120 can be implemented as one of a plurality of redundant physical hardware platforms, where each platform is configured to receive and route file system protocol traffic and is further configured with fail-over capability such that file system protocol traffic directed to a failed platform is automatically routed to a non-failed platform for routing.

In the illustrated exemplary embodiment, FSPR platform 120 includes one or more processor cores 122 for processing data and program code, local storage 126 (e.g., volatile and/or non-volatile storage devices) for storing data and program code, and at least one network adapter 124 supporting communication via data network(s) 114 with client nodes 102 and file server 140. Processor core(s) 122, local storage 126, and network adapter 124 are all communicatively coupled to a system interconnect 130, which may include, for example, one or more chassis buses and/or switches. In at least some implementations, communication on system interconnect 130 employs different protocol(s) than employed on data network(s) 114, for example, a bus protocol having fewer protocol layers (e.g., only physical and link layers).

In accordance with one aspect of the disclosed inventions, local storage 126 of FSPR platform 120 includes one or more reflected file system structure(s) 128. In at least one embodiment, each reflected file system structure 128 is a local skeleton copy of a file system structure (e.g., tree, graph, web, etc.) physically residing on the network-accessible storage to which and from which communication is routed by FSPR platform 120. By storing file system information in a file system structure rather than in a database or other conventional data structure, FSPR platform 120 can access from local storage 126 routing and other relevant information for file system traffic at decreased latency and can provide extended file system functionality for network-accessible storage, as discussed in greater detail below.

In some embodiments, the network-attached storage presented to FSPR platform 120 by file server 140 may include only network file shares 150*a*1-150*an*. In some other embodiments, file server 140 may optionally present to FSPR platform 120 additional network file shares 150*b*1-150*bn* and/or 150*c*1-150*cn* that may be managed by FSPR platform 120 together with network file shares 150*a*1-150*an*. As discussed further below, these additional network file shares 150*b*1-150*bn* and/or 150*c*1-150*cn*, which are not presented to or mountable by client nodes 102, may be managed by FSPR platform 120 in conjunction with primary network file shares 150*a*1-150*an* to provide a tiered storage architecture in which more frequently accessed and/or more recently accessed data are stored in a primary storage tier and less frequently accessed and/or less recently accessed data are stored in one or more additional storage tiers, such as a secondary or tertiary storage tier. Thus, for example, for a given file system, FSPR platform 120 may utilize primary network file share 150*a*1 as an upper storage tier, network file share 150*b*1 as a secondary storage tier, and network file share 150*c*1 as a tertiary storage tier for a given set of users, client nodes 102, or enterprises. Similarly, FSPR platform 120 may manage others of primary network file shares 150*a*1-150*an* as an upper storage tier in conjunction with one or more of network file shares 150*b*1-150*bn* as a secondary storage tier, and optionally, one or more of network file shares 150*c*1-150*cn* as a tertiary storage tier. In many cases, the network file shares 150*b* and 150*c* utilized as lower storage tiers are presented by a different file server 140 than presents primary network file share(s) 150*a*.

Figure 2:
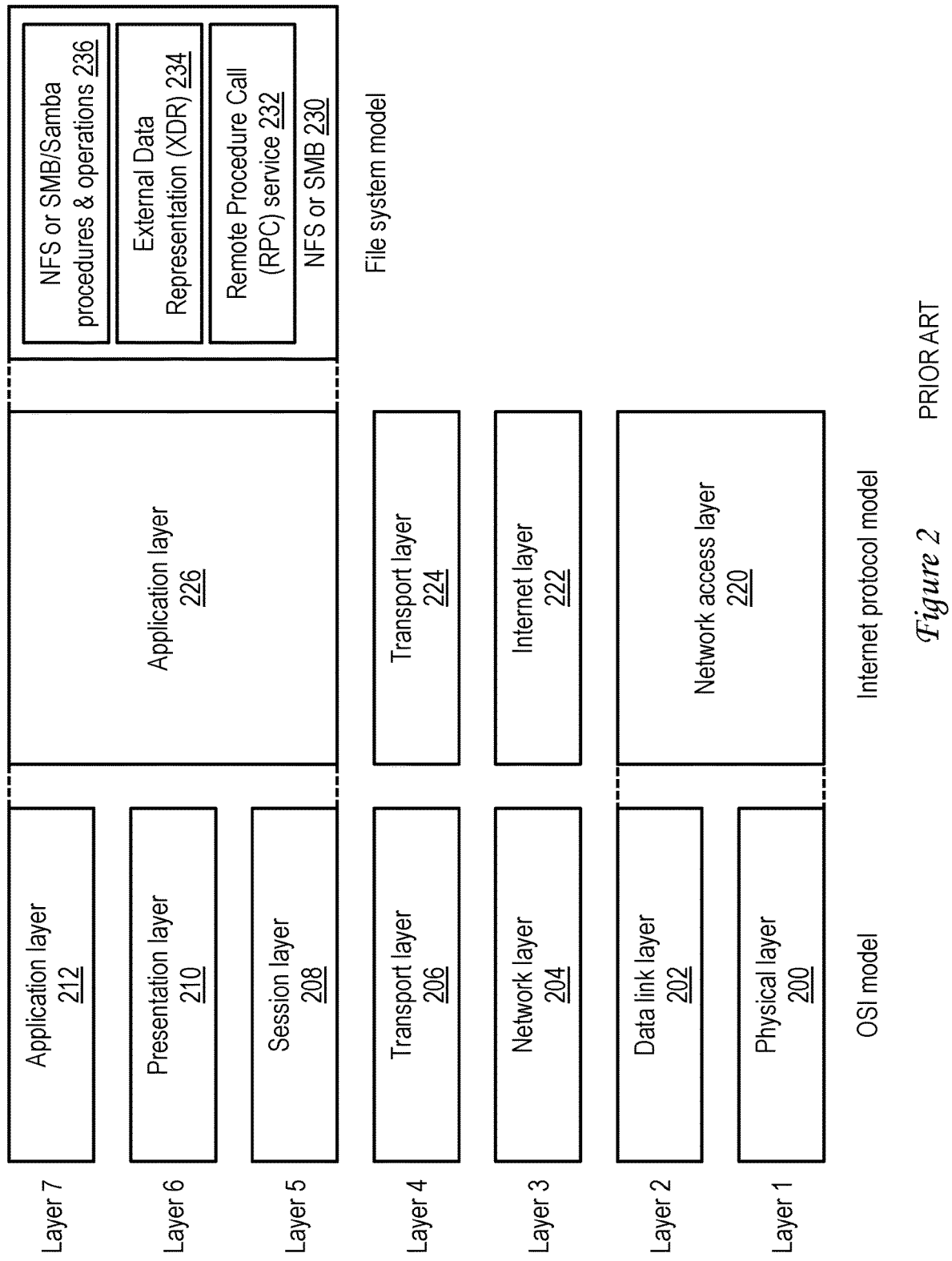
FIG. 2 is a layer diagram illustrating a protocol stack that can be utilized to communicate file system protocol traffic on a data network in accordance with one embodiment.

With additional reference now to FIG. 2, data network(s) 114 of FIG. 1 preferably implement layered networking protocols, which in some examples may be compliant with or generally correspond to the well-known seven layer Open Systems Interconnection (OSI) model. As shown in FIG. 2, the OSI model includes (in ascending order from Layer 1 to Layer 7) physical layer 200, data link layer 202, network layer 204, transport layer 206, session layer 208, presentation layer 210, and application layer 212.

In some embodiments, the networking protocols may include, for example, the Internet Protocol (IP) suite, which includes a network access layer 220 (e.g., Ethernet, FDDI, ATM, etc.) that generally corresponds to Layers 1 and 2 of the OSI model, an Internet layer 222 that corresponds to Layer 3 of the OSI model, a transport layer (e.g., TCP, UDP, ICMP, etc.) that corresponds to Layer 4 of the OSI model, and application layer 226 (e.g., file system commands, SMTP, Telnet, FTP, etc.) that corresponds to Layers 5 to 7 of the OSI model. As known to those skilled in the art, in the IP suite, protocol data units (PDUs) of higher protocol layers are encapsulated within PDUs of lower protocol layers. Thus, a PDU of application layer 226, is encapsulated in a PDU of transport layer 224, which is encapsulated in a PDU of Internet layer 222, which is in turn encapsulated in a PDU of network access layer 220 for transmission over a data network 114.

As further depicted in FIG. 2, the application layer 226 of the IP suite can be utilized to communicate file system protocol traffic. For example, for network-accessible storage implementing the Network File System (NFS) or Server Message Block (SMB) protocol 230, application layer 226 of the IP model can include, at a lower layer, a remote procedure call (RPC) service 232 that enables applications executing on one platform to call procedures (functions) on another remote platform. Above RPC service 232, an external data representation (XDR) layer 234 provides a standard representation for data in order to support heterogeneous network computing. At a highest layer, the NFS or SMB protocol 230 includes NFS or SMB/Samba procedures and operations 236 that support file system commands, such as open, close, save, rename, move, write, delete, etc. Of course, other file systems can implement differing protocols at application layer 226.

Figure 3:
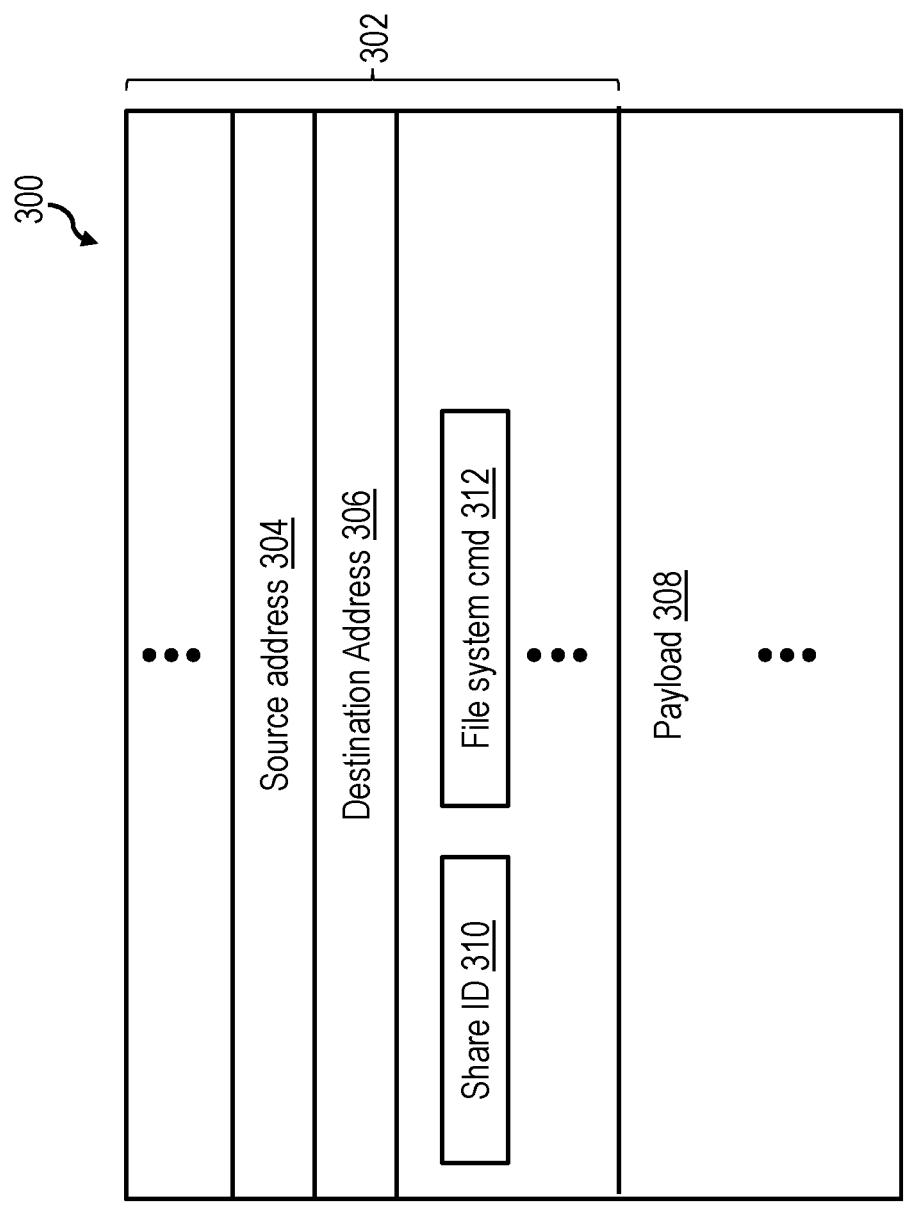
FIG. 3 illustrates an exemplary protocol data unit (PDU) that can be utilized to communicate file system protocol traffic on a data network in accordance with one embodiment.

With reference now to FIG. 3, there is illustrated an exemplary protocol data unit (PDU) 300 that can be utilized to communicate file system protocol traffic on data network(s) 114 of FIG. 1 utilizing the layered protocols depicted in FIG. 2. In this embodiment, PDU 300 generally includes a header 302 and a payload 308. Header 302 includes a number of fields, including a source address field 304 that specifies the network address of the source entity that initiated transmission of PDU 302 and a destination address field 306 that specifies the network address of the destination entity that is the intended recipient of PDU 300. For lower protocol layers of the IP suite, payload 308 includes the encapsulated PDUs 300 of higher protocol layers. At application layer 226, header 302 can include a share ID field 310 for specifying a network file share 150 and a file system command field 312 for specifying a file system command requesting or implying one or more types of file system operations on FSOs, such as directory list, open, close, save, rename, move, write, delete, etc.

Referring now to FIG. 4, there is depicted a layer diagram illustrating an exemplary software stack 400 that can be executed by processor core(s) 122 of FSPR platform 120 to provide capabilities including the routing of file system protocol traffic and the extension of file system functionality in accordance with one or more embodiments. As shown, software stack 400 includes, at a lower level, a file system protocol routing layer 402. File system protocol routing layer 402 inspects and routes Layer 3 packets containing file system protocol traffic, for example, as described below with reference to FIG. 7. In some embodiments, file system protocol routing layer 402 may provide enhanced security for network-accessible storage, for example, utilizing a detection component 404 configured to detect abnormal file system access patterns, an isolation component 406 configured to cause file system protocol routing layer 402 to discard or otherwise deny abnormal file system accesses detected by detection component 404, and a remediation component 408 configured to prevent or remediate data loss arising from abnormal file system accesses.

Software stack 400 additionally includes a reflector file system (RFS) layer 410 that is configured to construct, update, and access a respective reflected file system structure 128 in local storage 126 of FSPR platform 120 for each file system for which file system protocol traffic is routed by FSPR platform 120. RFS layer 410 and file system protocol routing layer 402 can be configured in accordance with the rules defined by business logic 412.

Software stack 400 further includes a browser extension layer 414 configured to extend the functionality provided by the underlying file system of the network-accessible storage and FSB 112. These browser extensions can be presented by a client node 102 for user selection, for example, via a "right-click" or "two-finger tap" menu extension 442 or other auxiliary control provided to FSB 112 by browser extension 414.

For example, in the depicted embodiment, browser extension layer 414 supports an indexing function 420 that enables a user, via FSB 112, to conduct a textual search of FSOs within the file system. In embodiments in which indexing function 420 is implemented, indexing function 420 extracts textual content of FSOs (including, in some embodiments, textual content obtained by through optical character recognition (OCR) of image files) in a background process and stores the extracted content in an index 129 (see, e.g., FIG. 1). In various implementations, index 129 can be maintained by FSPR platform 120, for example, in local storage 126 or in one of network file shares 150. RFS 410 is preferably configured to record within reflected file system structure 128 indications of which FSOs are configured for indexing, have been indexed, and/or logically contain other FSOs that have been partially but incompletely indexed. In one example, these indications, which can be stored within the extended attributes of the associated FSOs, can be accessed by RFS 410, served to a client node 102 by browser extension layer 414, and graphically presented by FSB 112 in the form of graphical "indexed badges" (e.g., circles) presented in association with icons or textual strings representing FSOs. Utilizing a search engine 440 provided to FSB 112 by browser extension 414 or another search interface in communication with FSPR 120 via network 114, a user can request and obtain a listing of FSOs in the file system containing content matching a user-supplied textual search query. In a preferred embodiment, browser extension layer 414 can present the listing of FSOs matching the textual search query, and in some implementations, snippets of the FSOs surrounding the portion of the FSO matching the textual search query, within FSB 112.

The browser extensions provided by browser extension layer 414 can alternatively or additionally include a tagging function 422 that extends a user's ability to identify relevant FSOs in the file system. In at least some embodiments, tagging function 422 enables a user, such as a storage administrator, to selectively apply textual, color, graphical, image, and/or other tags to FSOs as desired in order to differentiate different FSOs. In some implementations, the storage administrator applies tags to FSOs by defining logical rule(s) associating specific content (e.g., text, photographs, graphics, video, executable code, etc.) with an associated tag. For example, the storage administrator may define a logical rule that applies to a FSO a PII (Personally Identifiable Information) tag if the FSO contains a driver's license number, tax identifier, Social Security number, passport number, credit card number, etc. In this manner, tagging function 422 can automatically apply one or more tags to any existing FSO, updated FSO, or newly created FSO that satisfies a predefined logical rule. As should be appreciated, FSPR platform 120 can thus be configured to perform an automated content audit of the file system, categorizing and flagging content of interest as specified by one or more logical rules. Business logic 412 may further cooperate with tagging function 420 to define one or more tag-related notification rules that specify the timing, type, content, and frequency of notifications to a storage administrator via administration and reporting layer 450 based on tagging events. For example, these tag-related notification rules may issue a notification to a storage administrator based on tagging of executable code (e.g., a suspected virus) within a FSO (where the FSO may further be qualified by a particular file system folder), or tagging of content that violates terms of service of file server 140 (e.g., inappropriate or offensive images or text or content that infringes a copyright), or tagging of obsolete or out-of-date content. In at least some implementations, a user can also manually apply tags to FSOs.

The associations of tags with FSOs are preferably recorded within both index 129 and the extended attributes of the relevant FSOs in reflected file system structure 128. Utilizing browser extension layer 414, a user can request and obtain, via FSB 112, a listing of FSOs in the file system matching a user-specified tag. For example, in some embodiments, browser extension layer 414 allows users to right-click on an icon or directory entry representing a FSO to invoke display of the tags, if any, that have been applied to that FSO. Additionally, in some embodiments, a user can configure FSB 112 to present various different graphical "tag badges" in association with the icons or directory entries representing the FSOs assigned those associated tags. Thus, assuming for example that the PII tag is associated with a yellow tag badge, a user can quickly visually identify within the window of FSB 112 which FSOs contain PII based on the presentation of a yellow tag badge in association with the icons or directory entries representing such FSOs.

The browser extensions presented by browser extension layer 414 can alternatively or additionally include a versioning feature 424. If versioning is implemented and is enabled by business logic 412, file system protocol routing layer 402 automatically creates within the network-accessible storage a new version of a FSO in response to receiving a "save", "delete", "rename", "move" or other command that modifies the content or associated attributes (metadata) of the FSO. The number of prior versions of FSOs that are maintained in the network-accessible storage can be configured in business logic 412 (e.g., a maximum of 5 prior versions in addition to the current version). By preserving the version of a FSO existing immediately before a potentially destructive change is made to the FSO or its attributes, permanent loss of the previous version of the FSO due to an inadvertent or malicious destructive change can be averted. Versioning feature 424 provides an auxiliary control that enables the presentation of available versions of a FSO for selection through FSB 112, for example, via an auxiliary menu extension 442 made available upon selection of the FSO. In some implementations, the previous versions available for selection can include a previously deleted FSO, thus providing an "undelete" function. File path information for the various versions of a FSO can be stored within reflected file system structure 128, for example, in the extended attributes of the relevant FSO.

Still referring to FIG. 4, software stack 400 can additionally include a data synchronization function 416 that can enable an additional suite of file system-related features. These data synchronization features can include, for example, a multicopy feature 426 that enables FSPR platform 120 to automatically create multiple copies of one or more FSOs in the file system (or on a different file system, network, or cloud) to promote security and/or high availability. In addition, data synchronization layer 416 facilitates a file recovery feature 430 that enables automatic recovery by FSPR platform 120 of FSOs in case a physical storage drive failure or other event renders a FSO on a given network file share 150 temporarily or permanently inaccessible. File path information utilized by multicopy feature 426 and file recovery feature 430 is stored within reflected file system structure 128, for example, in the extended attributes of the relevant FSOs. A capacity management feature 432 additionally allows FSPR platform 120 to automatically control data synchronization behaviors based on limit templates 446, which can define threshold drive capacities for the underlying storage devices presented by file server 140 as network file shares 150. Data synchronization layer 416 can additionally enable an automated migration feature 434 by which FSPR platform 120 automatically copies the contents of one physical data storage drive to another physical data storage drive, permitting the selective removal or demotion of the original physical data storage drive to a lower storage tier. An exemplary migration process that may be implemented by migration feature 434 is described in detail below with reference to FIG. 8.

Software stack 400 also includes a notification engine 444 that provides notifications regarding the operations performed by browser extension function 414, data synchronization function 416, and other components of software stack 400 to an upper administration and reporting layer 450. Administration and reporting layer 450 may in turn provide notifications to a storage administrator utilizing one or more modalities, including update of an administrator dashboard interface, email, text message, etc.

In at least some embodiments, FSPR platform 120 further includes a single-instancing function 436 that, if included and enabled, performs automated or selective single-instancing of FSOs within the file system, for example, based on hashes of the FSOs' data, as described in detail below with reference to FIG. 9. Single-instancing FSOs includes removing from the file system all duplicate FSOs so that only a single unique instance of each FSO remains in the file system. RFS 410 then routes any file access requests directed to one of the removed duplicates to the remaining single instance of the FSO based on file path information stored within reflected file system structure 128, for example, in the extended attributes of the referenced FSO.

Software stack 400 can additionally include a job engine 448 that queues and orders the operations performed by the various components of software stack 400. Depending on the type of operation, operations can be initiated by job engine 448 based on occurrence of an input/output (I/O) event, an input provided by an administrator via business logic 412, and/or chronological time (e.g., daily, weekly, monthly, etc.).

Administration and reporting layer 450 provides an interface through which a storage administrator utilizing one of computing nodes 102 can configure FSPR platform 120 and monitor and control its operation, as well as administer and view reporting on network file shares 150. The administration of the network file shares 150 can include, for example, establishing and managing tiering of network file shares and enabling single-instancing for some or all FSOs in a file system. In some embodiments, administration and reporting layer 450 is accessed via a web browser or special-purpose application (or app) executing on a computing node 102 of a storage administrator.

Figure 5:
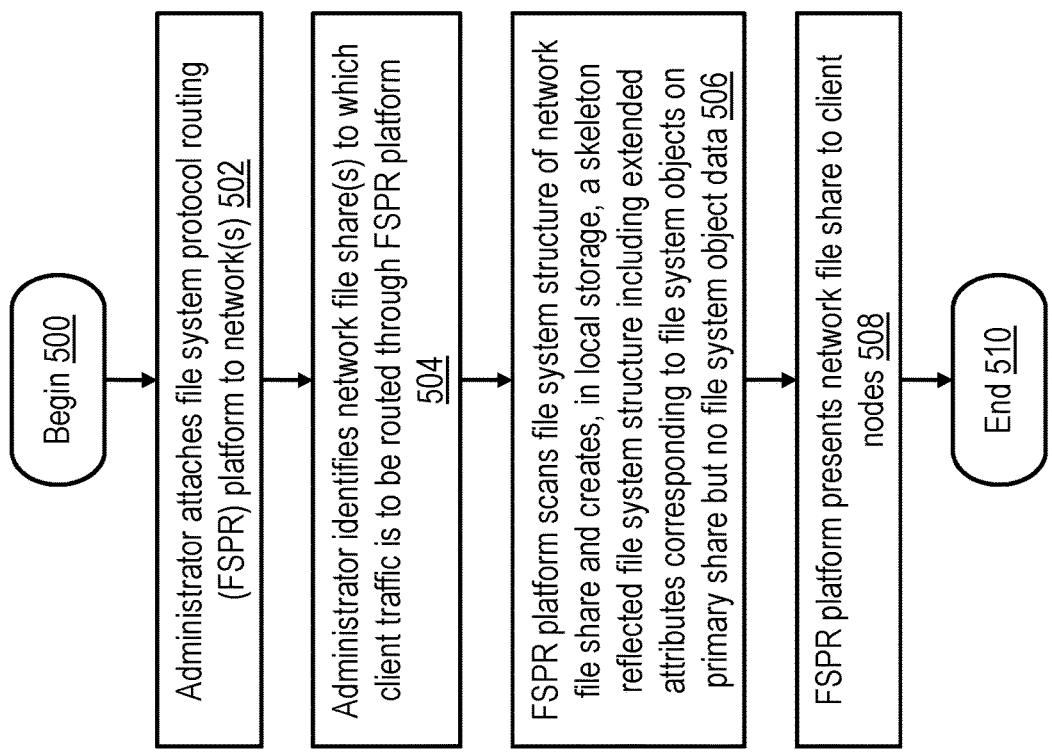
FIG. 5 is a high-level logical flowchart of an exemplary process of initializing a file system protocol routing platform in accordance with one embodiment.

With reference now to FIG. 5, there is illustrated a high-level logical flowchart of an exemplary process of initializing a FSPR platform 120 in accordance with one embodiment. The process of FIG. 5 begins at block 500 and then proceeds to block 502, which illustrates a storage administrator attaching a FSPR platform 120 to data network(s) 114 to enable network communication by FSPR platform 120 with client nodes 102 and the network-accessible storage accessible via file server 140.

At block 504, the storage administrator identifies network file share(s) 150 presented by file server 140 for which client file system protocol traffic is to be routed through FSPR platform 120. The network file share(s) 150 can be identified, for example, by logical name, UUID (universally unique identifier), and/or other identifier. In at least some embodiments, the storage administrator connects to file server 140 as administrator and discovers all of the network file shares 150 presented by file server 140. Based on a presentation of the collection of network file shares 150 by file server 140, the storage administrator then identifies to FSPR platform 120 at least one network file share 150 presented by file server 140 for which file system protocol traffic is to be routed through FSPR platform 120. In various embodiments, a network administrator can identify the network file share(s) 150 to administration and visualization layer 450 of FSPR platform 120 through a direct connection to FSPR platform 120 or utilizing an application executing on one of computing nodes 102. In some embodiments, FSPR platform 120, responsive to attachment of FSPR platform 120 to data network 114 at block 502, automatically performs network discovery and presents, to the network administrator, a pick list of network file shares 150 from which the administrator can select one or more network file shares 150.

In addition, at block 506, RFS layer 410 of FSPR platform 120 automatically creates, in local storage 126 of FSPR platform 120, a reflected file system structure 128 corresponding to the file system structure of the primary network file share 150. To create the reflected file system structure 128 in local storage 126, RFS layer 410 scans the file system structure of each primary network file share 150 identified at block 504 and, for each discovered FSO in the file system structure on the primary network file share 150, creates in local storage 126 a corresponding FSO having the attributes (metadata) and file system path of the FSO, but no FSO data. (It should be noted that the attributes in local storage 126 are not limited to those defined by the underlying file system of the primary network file share, and RFS layer 410 can augment the attributes defined by the underlying file system of the primary network file share 150 in a set of extended attributes.)

Following block 506, FSPR platform 120 presents the primary network file share 150 to client nodes 102, serving as proxy for communication between client nodes 102 and the primary network file share 150 (block 508). Thus, mount function 110 at client nodes 102 will mount the primary network file share 150 proxied by FSPR platform 120 using the network address of FSPR 120 rather than that assigned to the primary network file share 150. The process of FIG. 5 thereafter ends at block 510.

Figure 6:
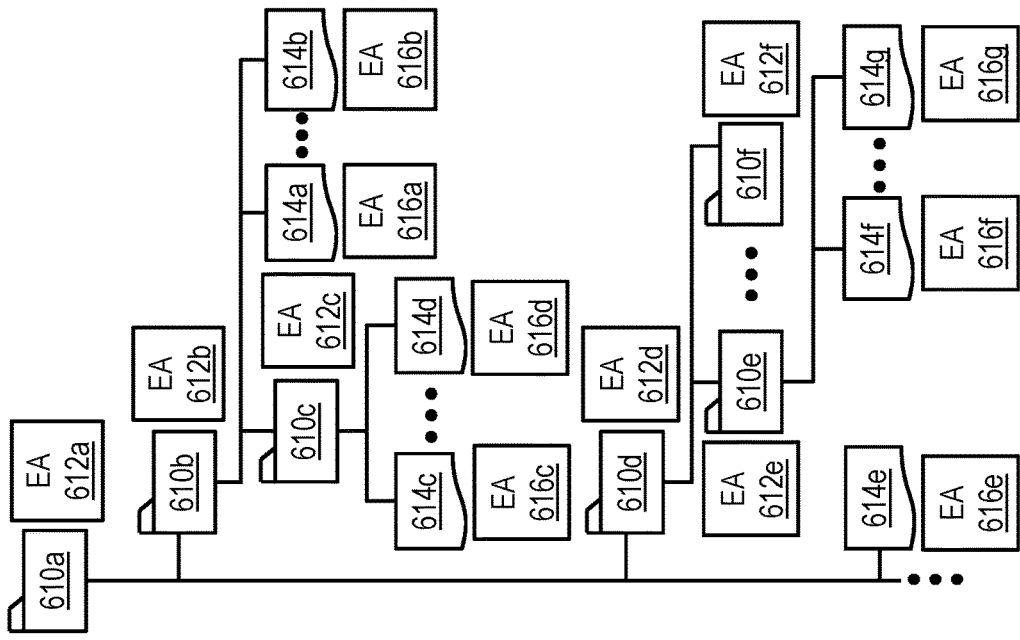
FIG. 6 depicts an exemplary file system structure of a primary network file share and a corresponding reflected file system structure stored in the local storage of a file system protocol routing platform in accordance with one embodiment.
Figure 6:
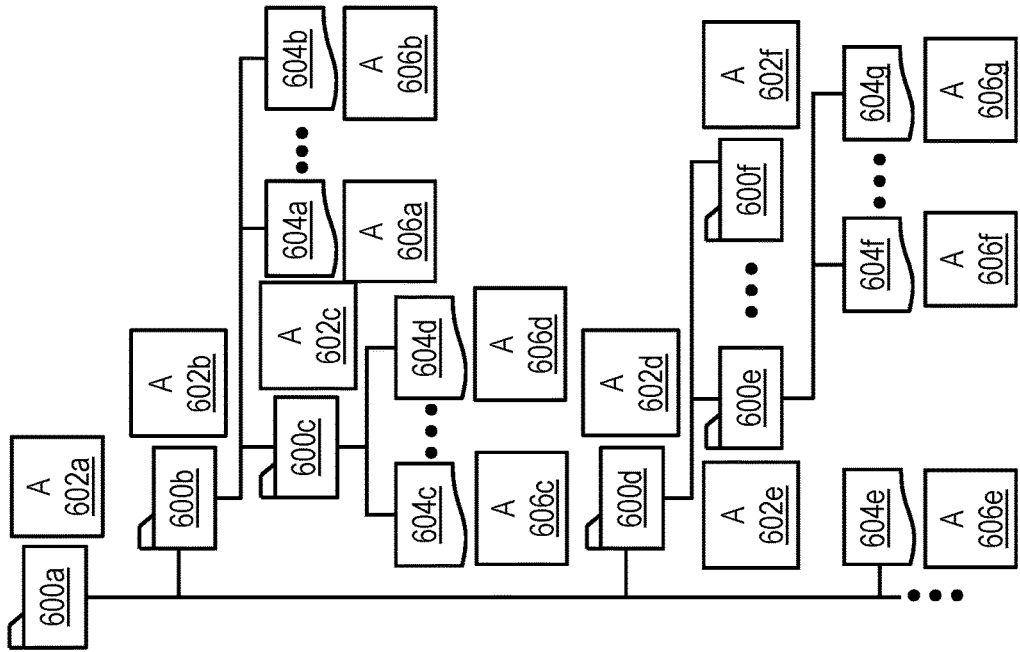

Referring now to FIG. 6, there is depicted an exemplary file system structure of a primary network file share 150 and a corresponding reflected file system structure 128 maintained by FSPR platform 120 in local storage 126 in accordance with one embodiment. In at least some embodiments, reflected file system structure 128 can be created by RFS layer 410 of FSPR platform 120 as described above with reference to block 506 of FIG. 5 and is thereafter maintained by RFS layer 410 in synchronization with the primary network file share 150.

In the snapshot provided in the illustrated example, a primary network file share 150 has a file system structure organized as a conventional file system tree including a top-level container (in this case, a folder 600*a*) containing a plurality of hierarchically arranged FSOs, including both further FSO containers (folders 600*b* to 600*f*) and individual files 604*a* to 604*g* containing data. Each FSO has associated file system-defined attributes (A) that provide metadata regarding the associated FSO. These attributes can include file system attributes such as the FSO size in bytes, timestamp of creation, timestamp of most recent modification, timestamp of last access time, access permissions, etc. Thus, folders 600*a* to 600*f* have respective associated attributes 602*a* to 602*f*, and files 604*a* to 604*g* have respective associated attributes 606*a* to 606*g*.

At block 506 of FIG. 5, RFS layer 410 of FSPR platform 120 creates, within its local storage 126, a reflected file system structure 128 corresponding to (i.e., reflecting) that of primary network file share 150. In this example, reflected file system structure 128 includes folders 610*a* to 610*f* respectively corresponding to folders 600*a* to 600*f* on primary network file share 150, as well as files 614*a* to 614*g* respectively corresponding to files 604*a* to 604*g* on primary network file share 150, with each FSO having the same file system path as the corresponding FSO on primary network file share 150. As noted above, the reflected file system structure 128 is preferably a "skeleton" file system structure in that files 614*a*-614*g* preferably do not contain the data contents of the corresponding files 604*a*-604*g* on the primary network file share 150 and are instead empty shells. Reflected file system structure 128 additionally includes extended attributes 612*a*-612*f* and 616*a*-616*g* respectively corresponding to (and extending) attributes 602*a*-602*f* and 606*a*-606*g* on primary network file share 150. For example, in addition to conventional file system attributes, the extended attributes within reflected file system structure 128 can include, among others, a hash (e.g., SHA-1, t1ha, etc.) of the FSO data and file access paths of other copies, if any, of the FSO, any tags applied to the FSO, an indication of whether or not the FSO has been single-instanced, and, if so, the access path to the remaining single version. It should be noted that even though files 614*a* to 614*g* of reflected file system structure 128 preferably contain no file data content, attributes 612*a*-612*f* and 616*a*-616*g* of reflected file system structure 128 preferably specify the FSO sizes of the corresponding FSOs on primary network file share 150.

Figure 7:
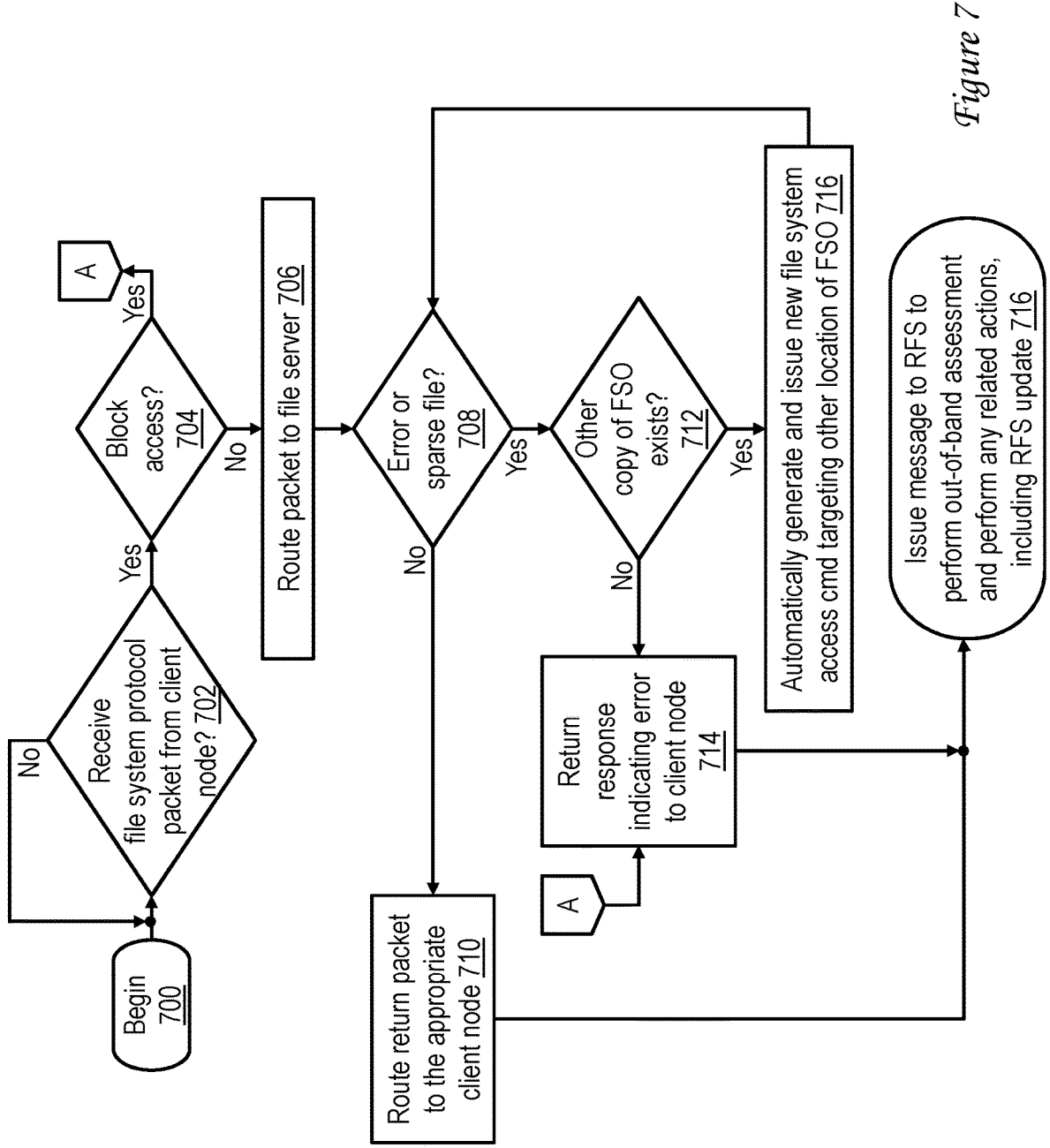
FIG. 7 is a high-level logical flowchart of an exemplary process by which a file system protocol routing platform routes file system protocol traffic in accordance with one embodiment.

With reference now to FIG. 7, there is illustrated a high-level logical flowchart of an exemplary process by which FSPR platform 120 routes file system protocol traffic received from a client node 102 in accordance with one embodiment. The process of FIG. 7 can be performed, for example, by a processor core 122 of FSPR platform 120 through the execution of software stack 400, and in particular, file system protocol routing layer 402.

The process of FIG. 7 begins at block 700 and then proceeds to block 702, which illustrates FSPR platform 120 detecting receipt from a client node 102 via data network 114 of a Layer 3 packet containing a file system protocol PDU. The Layer 3 packet specifies the network address of an initiating client node 102 in source address field 304 and the network address of FSPR platform 120 in destination address field 306. The file system protocol PDU in the Layer 3 packet can specify within file system command field 312 or can imply any of a variety of types of file system accesses, such as directory listing, open, close, save/write, rename, move, delete, etc., applicable to a target FSO. In response to receipt of the Layer 3 packet at block 702, the process of FIG. 7 proceeds to block 704.

Block 704 illustrates file system protocol routing layer 402 determining whether or not to block or restrict the file system command specified or implied by the file system protocol packet received at block 702. For example, isolation component 406 of file system protocol routing layer 402 may block or restrict the file system command based on detection by detection component 404 of an abnormal file system access pattern based on, for example, one or more of the following factors: a user ID of a user initiating the file system command, a number of file system accesses by a user group including at least the user within a given period of time, and a tag associated with a target FSO of the file access command. In response to file system protocol layer 402 determining at block 704 to restrict the file access command, the process passes through page connector A to block 714, which is described below. If, however, file system protocol layer 402 determines at block 704 to not restrict the file access command but to instead allow the file access command to proceed, the process proceeds to block 706.

At block 706, file system protocol routing layer 402 forwards the Layer 3 packet received at block 702 to file server 140. At block 708 file system protocol routing layer 402 determines whether or not a Layer 3 packet received from file server 140 in response to the file system command issued at block 704 indicates an error or that the requested FSO is a sparse file. A file system command can have an error returned by file server 140 for a number of reasons, including, for example, an access failure (e.g., due to file corruption) or a timeout (e.g., due to a network error).

In response to a determination at block 708 that file server 140 did not provide a response indicating the requested FSO is a sparse file or occurrence of an error, file system protocol routing layer 402 routes the Layer 3 packet received from file system 140 to the appropriate client node 102 (block 710). If, on the other hand, file system protocol routing layer 402 makes an affirmative determination at block 708 that a Layer 3 packet received from file system 140 in response to the packet routed at block 704 indicates an error or that the requested FSO is a sparse file, file system protocol routing layer 402 initiates a determination by RFS layer 410 whether or not reflected file system structure 128 in local storage 126 indicates an alternative copy of the target FSO to which access was requested by the file system command exists, for example, as could be the case if the target FSO is a multicopy FSO residing on a different file server or on a lower storage tier or if single-instancing has been performed for the target FSO (block 712). For example, RFS layer 410 can make the determination depicted at optional block 712 by performing a file system lookup of the target FSO in reflected file system structure 128 and examining the extended attributes 612 or 616 of the target FSO for the file access path of a copy of the target FSO. In response to RFS layer 410 making a negative determination at block 712, file system protocol routing layer 402 returns the Layer 3 packet indicating an error to the relevant client node 102 (block 714). However, in response to RFS layer 410 making an affirmative determination at block 712, RFS layer 410 automatically generates, and file system protocol routing layer 402 automatically issues via data network 114, a new Layer 3 packet containing a file system command of the same type as that received at block 702, but that specifies the file access path of the alternate copy of the target FSO (block 716). Thus, FSPR platform 120 can handle file system access failures (e.g., due to a physical storage drive failure, file server timeout, or other access failure) transparently to the requesting client node 102 if an alternate copy or multiple copies of the target FSO are implemented in the file system. The process then returns to block 708 and proceeds iteratively.

Following block 710 or block 714, the process of FIG. 7 then proceeds to block 716. Block 716 depicts file system protocol routing layer 402 issuing to RFS layer 410 a message notifying RFS layer 410 regarding the file system command and its associated success or failure. In response to the message, RFS layer 410 assesses the file system command and initiates any related actions in parallel with or otherwise independently of the routing performed by file system protocol routing layer 402. For example, RFS layer 410 may update reflected file system structure 128 in local storage 126 based on the file system command in order to maintain synchronization of reflected file system structure 128 with the file system structure on the network file share 150. The update to reflected file system structure 128 may include an update to only extended attributes 612 or 616 or may include updates to both extended attributes 612 or 616 and one or more FSOs (e.g., in the case of a movement, creation, or deletion of a FSO). Following issuance of the message by file system protocol routing layer 402 to RFS layer 410, the routing process of FIG. 7 ends at block 716.

Figure 8:
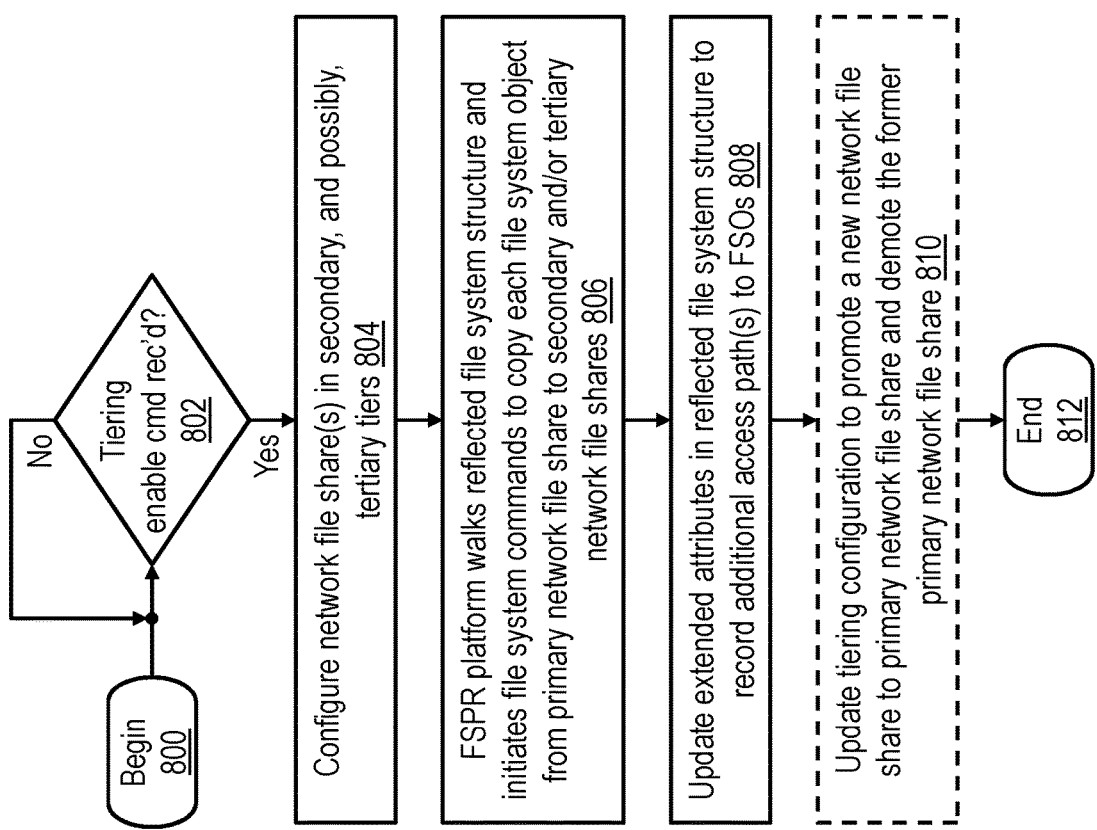
FIG. 8 is a high-level logical flowchart of an exemplary process by which a file system protocol routing platform synchronizes network file shares for purposes of tiering or data migration in accordance with one embodiment.

Referring now to FIG. 8, there is depicted a high-level logical flowchart of an exemplary process by which a FSPR platform 120 can implement storage tiering and/or migration in accordance with one embodiment. The process of FIG. 8 can be performed, for example, by a processor core 122 of FSPR platform 120 through execution of software stack 400, and in particular, the data synchronization layer 416 providing migration feature 434.

The process of FIG. 8 begins at block 800 and then proceeds to block 802, which illustrates FSPR platform 120 detecting a storage administrator enabling tiering for a particular primary network file share 150*a*1 to 150*an* presented by FSPR platform 120. In at least some embodiments, a storage administrator can enable tiering for the particular primary network file share 150 via an application executing on client node 102. In addition to enablement of tiering, the storage administrator can configure one or more additional network file shares 150 in a desired tiering arrangement with the primary network file share 150, for example, by designating one or more network file shares as secondary network file shares 150*b*1-150*bn* or tertiary network file shares 150*c*1-150*cn* (block 804). In the case of a migration of an existing primary network file share 150*a*, a newly added network file share can simply be designated as a secondary network file share 150*b* at block 804.

At block 806, FSPR platform 120 walks the reflected file system structure 128 in local storage 126 for the primary network file share 150*a* and initiates file system commands to copy each file system object on the primary network file share 150*a* to the secondary and/or tertiary network file share(s) 150 per the configuration specified at block 804. FSPR platform 120 additionally updates, within reflected file system structure 128, the extended attributes 612 or 616 of each FSO on the primary network file share 150 to identify the additional access path(s) to the FSOs that are now available on the secondary and/or tertiary network file share(s) 150 (block 808). The extended attributes 612 or 616 preferably identify each such access path as primary, secondary, or tertiary. It should be noted that when creating one or more additional copies of a FSO, FSPR platform 120 preferably does not update the timestamp of the most recent client access or modification, but instead retains the timestamp(s) of the client access to the source FSO for each copy. As depicted at optional block 810, if specified by the tiering configuration established at block 804, FSPR platform 120 can additionally update the tiering configuration to promote one of the secondary or tertiary network file shares 150 to become the new primary network file share 150*a* and to demote the former primary network file share 150*a* to a secondary or tertiary tier. This feature can be useful, for example, if a file server 140 is to be replaced (e.g., due to age, capacity, or planned hardware upgrade or if multiple older, lower capacity file servers are being consolidated onto a newer, larger capacity file server. Following optional block 810 (or block 808 if block 810 is omitted), the process of FIG. 8 ends at block 812.

It should be noted that during the migration of the file system from the primary network file share 150*a* to one or more other network file shares 150 at block 806 is a "live" migration, meaning that access to the file system is not suspended during the migration. Rather, during the file system migration, FSPR platform 120 continues to service file system commands targeting the migrating file system with respect to the currently designated primary network file share 150. A FSO created or modified by a file system command is simply added to the list of FSOs to be synced with the lower storage tier(s) and will be copied to the other tier(s) when that message is processed. If a FSO modified by a file system command was already synced to the lower tier(s), then the newly updated FSO will overwrite the previously synced FSO with updated information.

Figure 9:
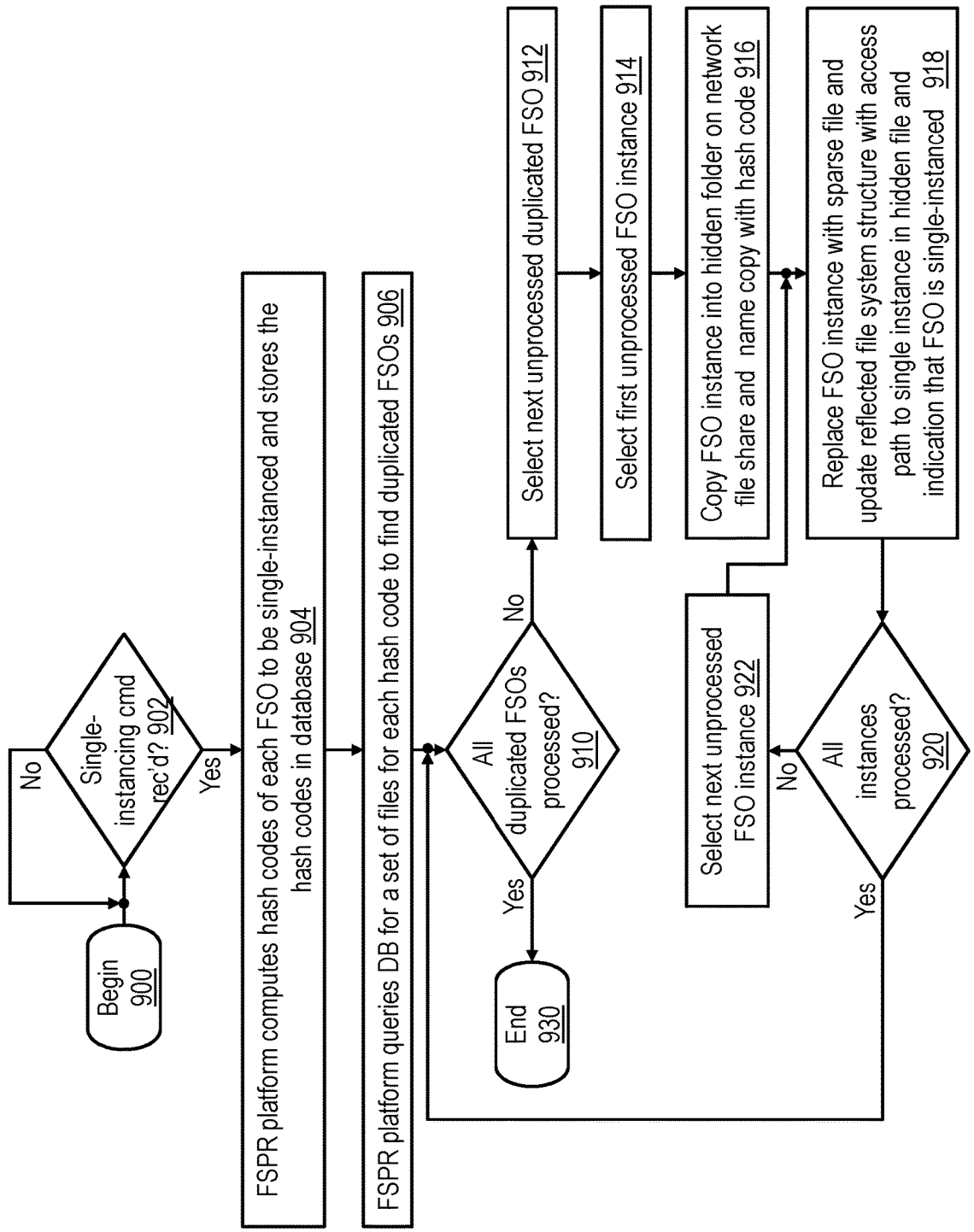
FIG. 9 is a high-level logical flowchart of an exemplary process by which a file system protocol routing platform implements single-instancing in accordance with one embodiment.

With reference now to FIG. 9, there is illustrated a high-level logical flowchart of an exemplary process by which a FSPR platform 120 implements single-instancing in accordance with one embodiment. The process of FIG. 9 can be performed, for example, by a processor core 122 of FSPR platform 120 through execution of software stack 400, and in particular, single-instancing function 436.

The process of FIG. 9 begins at block 900 and proceeds to block 902, which illustrates FSPR platform 120 detecting a single-instancing command enabling single-instancing for a collection of FSOs, for example, the FSOs on a particular network file share 150 presented by FSPR platform 120. The single-instancing command can be issued, for example, by a storage administrator from a client node 102 to administration and reporting layer 450. In response to receipt of the single-instancing command, job engine 448 of FSPR platform 120 preferably schedules a single-instancing job for the collection of FSOs, for example, in the background or at a chronological time of relatively low file system utilization (e.g., at night). Job engine 448 may additionally set the single-instancing job to run iteratively on a schedule (e.g., weekly).

FSPR platform 120 begins the single-instancing job by identifying duplicated FSOs. In the embodiment depicted in FIG. 9, FSPR platform 120 identifies the duplicated FSOs at blocks 904 and 906. Block 904 illustrates FSPR platform 120 walking the reflected file system structure 128 for the relevant file system, accessing from network file shares 150 each FSO in the collection of FSOs to be single-instanced (i.e., those not indicated in extended attributes 612 and 616 as already being single-instanced), computing a hash (e.g., SHA-1, t1ha, etc.) of data contents of each FSO in the collection of FSOs, and storing the resulting hash codes in a database. FSPR platform 120 then queries the database to obtain a set of one or more FSOs in the collection matching each unique hash code (block 906). FSPR platform 120 identifies each hash code having two or more matching FSOs as duplicated FSOs. FSPR platform 120 then preferably performs single-instancing for each duplicated FSO. One example of a single-instancing process is depicted at blocks 910-922 of FIG. 9.

At block 910, FSPR platform 120 determines whether or not all duplicated FSOs identified at block 906 have been processed. If so, the process of FIG. 9 ends at block 930. If, however, FSPR platform 120 determines at block 910 that fewer than all of the duplicated FSOs identified at block 906 have been processed, FSPR platform 120 selects a next unprocessed duplicated FSO for processing (block 912) and additionally selects a first unprocessed instance of the duplicated FSO (block 914). At block 916, FSPR platform 120 establishes what will become a single instance of the duplicated FSO by making a copy of the selected instance of the duplicated FSO in a hidden folder (i.e., a folder transparent to user nodes 102) on the network file share 150 and preferably names this new copy of the duplicated FSO with a unique name (e.g., the hash code of the FSO data). In addition, FSPR platform 120 replaces the selected FSO instance with a sparse file (i.e., a file whose content is all zero-bytes or null-bytes), while retaining its attributes 602 or 606 without change (block 918). At block 918, FSPR platform 120 additionally updates the extended attributes 612 or 616 of the corresponding FSO in reflected file system structure 128 with the access path to the single instance of the FSO in the hidden folder and an indication that the FSO has been single-instanced. Those skilled in the art will appreciate that if a file instance replaced by a sparse file at block 918 is subsequently accessed by a file access command issued by a client node 102, file server 140 will return a response to FSPR platform 120 that indicates the requested file has been sparsed. This response will cause FSPR platform 120 to automatically reissue to file server 140 a file access command specifying the file access path of the remaining single instance of the file, as described above with reference to blocks 708, 712, and 716 of FIG. 7.

At block 920, FSPR platform 120 determines whether or not all instances of the currently selected duplicated FSO have been processed. If not, FSPR platform 120 selects a next unprocessed instance of the duplicated FSO (block 922) and repeats the processing illustrated at block 918 for this next FSO instance. This iterative process continues until all instances of the selected (formerly) duplicated FSO have been processed. In response to a determination at block 920 that all instances of the now-de-duplicated FSO have been processed, the process of FIG. 9 returns to block 910, which has been described. Single-instancing FSOs in this manner advantageously reduces consumption of the storage capacity of the physical data storage devices underlying network file shares 150 while preserving all of the preexisting file system paths to the FSOs.

It should also be noted that, in some embodiments, following single-instancing, FSPR platform 120 can also eliminate the creation of new duplicate copies of existing FSOs in the file system. For example, FSPR platform 120 can detect whether or not an incoming file system command received from a client node 102 entails the creation of a new FSO. If so, FSPR platform 120 can determine whether or not the new FSO is a duplicate of an existing FSO, for example, by computing a hash of the new FSO and comparing the hash to the hashes of existing FSOs stored in the database formed and/or updated at block 904.

If the new FSO is not a duplicate of an existing FSO in the file system, FSPR platform 120 issues to file server 140 via data network 114 a file system command to create the FSO in the file system, creates a dataless copy of the new FSO in reflected file system structure 128, and stores within the extended attributes 612 or 616 of the copy of the new FSO in reflected file system structure 128 the file path to the single instance of the new FSO in the file system residing on network file shares 150. If, however, FSPR platform 120 determines that the new FSO is a duplicate of an existing FSO in the file system, FSPR platform 120 can issue a file system command to file server 140 to create a sparse file in lieu of a duplicate FSO. In addition, FSPR platform 120 can create a dataless copy of the new FSO in reflected file system structure 128 and update the extended attributes 612 or 616 of the new FSO in reflected file system structure 128 with the access path of the single instance of the FSO already residing in the file system on network file shares 150. In some current systems, such substantially real-time deduplication may not be practical or desirable due to the processing time required to compute file hashes.

Figure 10:
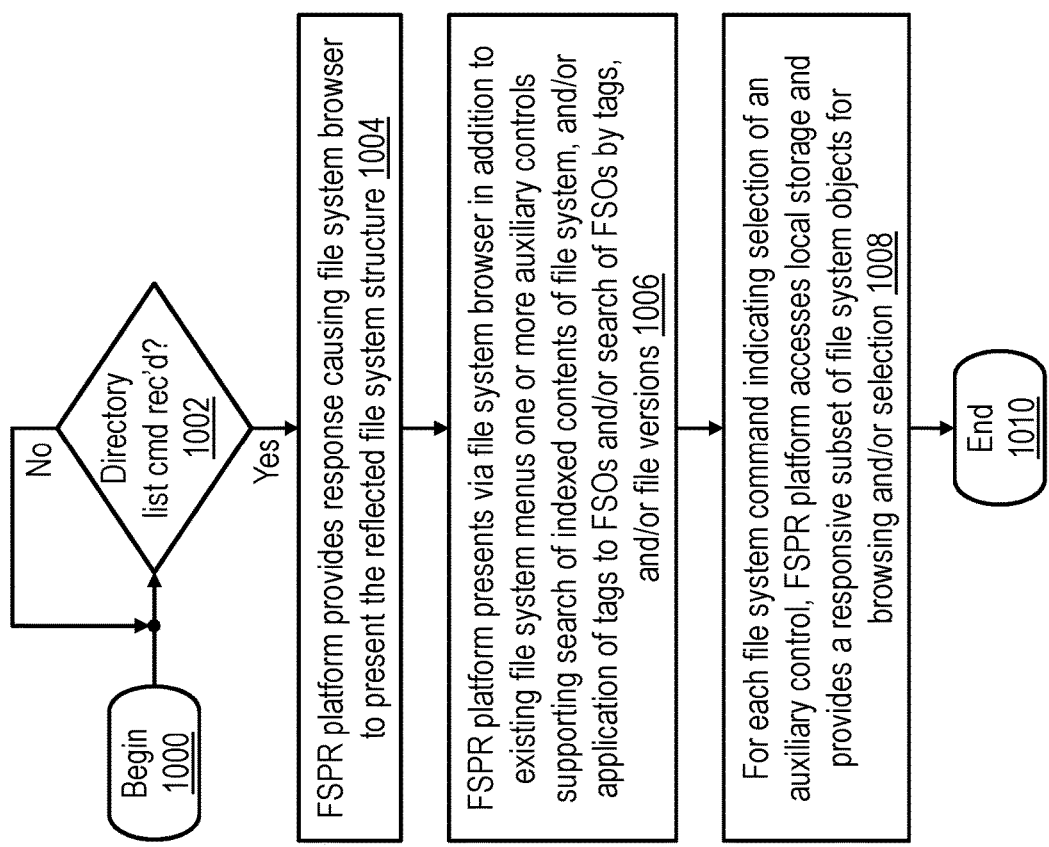
FIG. 10 is a high-level logical flowchart of an exemplary process by which a file system protocol routing platform implements various file system browser extensions in accordance with one embodiment.

Referring now to FIG. 10, there is depicted a high-level logical flowchart of an exemplary process by which a FSPR platform 120 implements various file system browser extensions in accordance with one embodiment. The process of FIG. 10 can be performed, for example, by a processor core 122 of FSPR platform 120 through execution of software stack 400, and in particular, the browser extension layer 414.

The process of FIG. 10 begins at block 1000 and then proceeds to block 1002, which illustrates FSPR platform 120 detecting whether or not a received file system command is a directory list command. In response to detection of a directory list command, FSPR platform 120 provides a response causing the FSB 112 to present the reflected file system structure 128 maintained in local storage 126. As a consequence, any single-instancing implemented by FSPR platform 120 will remain transparent to the user. FSPR platform 120 additionally presents via FSB 112 one or more auxiliary controls in addition to the existing file system browser controls (block 1006). As noted above, these auxiliary controls, which can be presented, for example, in one or more secondary menus, can include menu item(s) that enable a textual search of indexed FSOs, that enable the application of user-specified tags to FSOs and search of FSOs by tag, and/or that enable access to multiple file versions (including deleted versions). In response to receipt of file system protocol traffic containing a file system command indicating selection of one of the auxiliary controls, FSPR platform 120 accesses its local storage 126 and returns to FSB 112 a responsive subset of file system objects for presentation, browsing, and/or selection (block 1008). Following block 1008, the process of FIG. 10 ends at block 1010.

As has been described, a routing platform coupled to a data network maintains, on local storage of the routing platform, a reflected file system structure corresponding to that of a file system on a network file share. The file system includes a file system object including file system object data, and the reflected file system structure includes a copy of the file system object lacking the file system object data. The routing platform presents, as a proxy, the network file share to a client node communicatively coupled to the routing platform via the data network. The routing platform routes file system protocol traffic between the client node and the network file share, and, if needed, does so by reference to the reflected file system structure.

The present invention may be implemented as a method, a system, and/or a computer program product. The computer program product may include a storage device having computer readable program instructions (program code) thereon for causing a processor to carry out aspects of the present invention. As employed herein, a "storage device" is specifically defined to include only statutory articles of manufacture and to exclude signal media per se, transitory propagating signals per se, and energy per se.

Aspects of the present invention are described herein with reference to flowchart illustrations and/or block diagrams that illustrate the architecture, functionality, and operation of possible implementations of systems, methods, and computer program products according to various embodiments. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will be understood that each block of the block diagrams and/or flowcharts and combinations of blocks in the block diagrams and/or flowcharts can be implemented by special purpose hardware-based systems and/or program code that perform the specified functions. While the present invention has been particularly shown as described with reference to one or more preferred embodiments, it will be understood by those skilled in the art that various changes in form and detail may be made therein without departing from the spirit and scope of the invention.

The figures described above and the written description of specific structures and functions are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms and that multiple of the disclosed embodiments can be combined. Lastly, the use of a singular term, such as, but not limited to, "a" is not intended as limiting of the number of items.

What is claimed is:

1. A method of routing file system protocol traffic on a data network, the method comprising:
    a hardware routing platform coupled to a data network maintaining, on a local storage device of the routing platform, a reflected file system structure corresponding to that of a file system on a network file share accessible via the data network, wherein the file system includes a file system object including file system object data and the reflected file system structure includes a copy of the file system object lacking the file system object data;
    the routing platform presenting the network file share to a client node communicatively coupled to the routing platform via the data network;
    the routing platform receiving file system protocol traffic initiated by the client node that is intended for the network file share and addressed to the routing platform, the file system protocol traffic including a file system access command targeting the file system object;
    based on receiving the file system protocol traffic of the client node, the routing platform routing the file system protocol traffic between the client node and the network file share via the routing platform, wherein the routing includes the routing platform forwarding the file system access command to the network file share via the access path and providing, to the client node, a response of the network file share to the file system access command; and
    the routing platform extending functionality of the file system by reference to the reflected file system structure.

2. The method of claim 1, wherein extending functionality of the file system includes:
    the routing platform, based on receiving notification from the network file share of an access failure to the file system object, obtaining from the reflected file system structure an access path to an alternative copy of the file system object and automatically reissuing, without first notifying the client node, a file system access command to access the alternative copy of the file system object via the access path.

3. The method of claim 2, wherein obtaining the access path includes obtaining the access path from extended attributes associated with the copy of the file system object in the reflected file system structure.

4. The method of claim 1, wherein:
    the network file share is a first network file share;
    extending functionality of the file system by reference to the reflected file system structure includes:
        based on a first configuration command, the routing platform automatically creating a copy of the first network file share on a second network file share by issuing, on the data network, a plurality of file system commands by reference to the reflected file system structure.

5. The method of claim 4, further comprising:
    based on a second configuration command, demoting the first network file share and promoting the second network file share to a primary network file share.

6. The method of claim 1, wherein extending functionality of the file system by reference to the reflected file system structure includes:
    the routing platform implementing single-instancing of file system objects on the network file share, wherein implementing single-instancing includes deleting a duplicate copy of the file system object from the network file share; and
    in the reflected file system structure, the routing platform updating extended attributes associated with the duplicate copy of the file system object to specify an access path to a single instance of the file system object from the network file share.

7. The method of claim 1, wherein extending functionality of the file system by reference to the reflected file system structure includes:
    based on selection of a control of a file system browser at the client node, the routing platform determining by reference to the reflected file system structure multiple responsive file system objects forming only a subset of file system objects on the network file share and providing, to the client node, a listing of the multiple responsive file system objects.

8. The method of claim 7, wherein:
    the control comprises one of the following set: a control for a textual search of contents of file system objects, a control for visual presentation of tags applied to file system objects, and a control for searching versions of file system objects.

9. The method of claim 1, further comprising the routing platform, based on receiving the file system protocol traffic, determining whether to restrict access by the client node to the network file share, wherein the routing platform routes the file system protocol traffic based on determining not to restrict access by the client node to the network file share.

10. A routing platform, the routing platform comprising:
    a processor core;
    local data storage including a storage device communicatively coupled to the processor core;
    a network adapter communicatively coupled to the processor core and configured to be communicatively coupled to a data network; and
    program code stored within the data storage, wherein the program code, when executed by the processor core, configures the routing platform to perform:
        maintaining, in the storage device of the routing platform, a reflected file system structure corresponding to that of a file system on a network file share accessible via the data network, wherein the file system includes a file system object including file system object data and the reflected file system structure includes a copy of the file system object lacking the file system object data;
        presenting the network file share to a client node communicatively coupled to the routing platform via the data network;
        receiving file system protocol traffic initiated by the client node that is intended for the network file share and addressed to the routing platform, the file system protocol traffic including a file system access command targeting the file system object;
        based on receiving the file system protocol traffic of the client node, routing the file system protocol traffic between the client node and the network file share via the routing platform, wherein the routing includes forwarding the file system access command to the network file share via the access path and providing, to the client node, a response of the network file share to the file system access command; and
        extending functionality of the file system by reference to the reflected file system structure.

11. The routing platform of claim 10, wherein extending functionality of the file system includes:
    based on receiving notification of an access failure to the file system object from the network file share, obtaining from the reflected file system structure an access path to an alternative copy of the file system object and automatically reissuing, without first notifying the client node, a file system access command to access the alternative copy of the file system object via the access path.

12. The routing platform of claim 11, wherein obtaining the access path includes the routing platform obtaining the access path from extended attributes associated with the copy of the file system object in the reflected file system structure.

13. The routing platform of claim 10, wherein:
    the network file share is a first network file share;
    extending functionality of the file system by reference to the reflected file system structure includes:
        based on a first configuration command, automatically creating a copy of the first network file share on a second network file share by issuing, on the data network, a plurality of file system commands by reference to the reflected file system structure.

14. The routing platform of claim 13, wherein the program code further configures the routing platform to perform:
    based on a second configuration command, demoting the first network file share and promoting the second network file share to a primary network file share.

15. The routing platform of claim 10, wherein extending functionality of the file system by reference to the reflected file system structure includes:
    implementing single-instancing of file system objects on the network file share, wherein implementing single-instancing includes deleting a duplicate copy of the file system object from the network file share; and
    in the reflected file system structure, updating extended attributes associated with the duplicate copy of the file system object to specify an access path to a single instance of the file system object from the network file share.

16. The routing platform of claim 10, wherein extending functionality of the file system by reference to the reflected file system structure includes:
    based on selection of a control of a file system browser at the client node, determining by reference to the reflected file system structure multiple responsive file system objects forming only a subset of file system objects on the network file share and providing, to the client node, a listing of the multiple responsive file system objects.

17. The routing platform of claim 16, wherein:
    the control comprises one of the following set: a control for a textual search of contents of file system objects, a control for visual presentation of tags applied to file system objects, and
    a control for searching versions of file system objects.

18. The routing platform of claim 10, wherein the program code configures the routing platform to perform:
    based on receiving the file system protocol traffic, determining whether to restrict access by the client node to the network file share, wherein the routing platform routes the file system protocol traffic based on determining not to restrict access by the client node to the network file share.

19. A program product, comprising:
    a storage device; and
    program code stored within the storage device, wherein the program code, when executed by a processor core of a routing platform, configures the routing platform to perform:
        maintaining, in the storage device of the routing platform, a reflected file system structure corresponding to that of a file system on a network file share accessible via the data network, wherein the file system includes a file system object including file system object data and the reflected file system structure includes a copy of the file system object lacking the file system object data;

presenting the network file share to a client node communicatively coupled to the routing platform via the data network;

receiving file system protocol traffic initiated by the client node that is intended for the network file share and addressed to the routing platform, the file system protocol traffic including a file system access command targeting the file system object; and based on receiving the file system protocol traffic of the client node, routing the file system protocol traffic between the client node and the network file share via the routing platform, wherein the routing includes forwarding the file system access command to the network file share via the access path and providing, to the client node, a response of the network file share to the file system access command; and extending functionality of the file system by reference to the reflected file system structure.

20. The program product of claim 19, wherein extending functionality of the file system includes:

based on receiving notification of an access failure to the file system object from the network file share, obtaining from the reflected file system structure an access path to an alternative copy of the file system object and automatically reissuing, without first notifying the client node, a file system access command to access the alternative copy of the file system object via the access path.

21. The program product of claim 20, wherein obtaining the access path includes the routing platform obtaining the access path from extended attributes associated with the copy of the file system object in the reflected file system structure.

22. The program product of claim 19, wherein:

the network file share is a first network file share;

extending functionality of the file system by reference to the reflected file system structure includes:

based on a first configuration command, automatically creating a copy of the first network file share on a second network file share by issuing, on the data network, a plurality of file system commands by reference to the reflected file system structure.

23. The program product of claim 22, wherein the program code further configures the routing platform to perform:

based on a second configuration command, demoting the first network file share and promoting the second network file share to a primary network file share.

24. The program product of claim 19, wherein extending functionality of the file system by reference to the reflected file system structure includes:

implementing single-instancing of file system objects on the network file share, wherein implementing single-instancing includes deleting a duplicate copy of the file system object from the network file share; and in the reflected file system structure, updating extended attributes associated with the duplicate copy of the file system object to specify an access path to a single instance o the file system object from the network file share.

25. The program product of claim 19, wherein extending functionality of the file system by reference to the reflected file system structure includes:

based on selection of a control of a file system browser at the client node, determining by reference to the reflected file system structure multiple responsive file system objects forming only a subset of file system objects on the network file share and providing, to the client node, a listing of the multiple responsive file system objects.

26. The program product of claim 25, wherein:

the control comprises one of the following set: a control for a textual search of contents of file system objects, a control for visual presentation of tags applied to file system objects, and a control for searching versions of file system objects.

27. The program product of claim 19, wherein the program code configures the routing platform to perform:

based on receiving the file system protocol traffic, determining whether to restrict access by the client node to the network file share, wherein the routing platform routes the file system protocol traffic based on determining not to restrict access by the client node to the network file share.

* * * * *